US011422945B2

(12) United States Patent
Palmer

(10) Patent No.: US 11,422,945 B2
(45) Date of Patent: Aug. 23, 2022

(54) GENERATING, MAINTAINING, OR UTILIZING A COMPRESSED LOGICAL-TO-PHYSICAL TABLE BASED ON SEQUENTIAL WRITES

(71) Applicant: Micron Technology, Inc., Boise, ID (US)

(72) Inventor: David A. Palmer, Boise, ID (US)

(73) Assignee: MICRON TECHNOLOGY, INC., Boise, ID (US)

(*) Notice: Subject to any disclaimer, the term of this patent is extended or adjusted under 35 U.S.C. 154(b) by 20 days.

(21) Appl. No.: 16/831,499

(22) Filed: Mar. 26, 2020

(65) Prior Publication Data
US 2021/0294752 A1 Sep. 23, 2021

Related U.S. Application Data

(60) Provisional application No. 62/992,542, filed on Mar. 20, 2020.

(51) Int. Cl.
*G06F 12/1027* (2016.01)
(52) U.S. Cl.
CPC .................. *G06F 12/1027* (2013.01)
(58) Field of Classification Search
None
See application file for complete search history.

(56) References Cited

U.S. PATENT DOCUMENTS

| 2012/0089811 | A1* | 4/2012 | Sawai | G06F 12/1027 |
| | | | | 711/207 |
| 2019/0220416 | A1* | 7/2019 | Jung | G06F 12/1009 |
| 2020/0065241 | A1* | 2/2020 | Cho | G11C 11/4082 |
| 2020/0310987 | A1* | 10/2020 | Choi | G06F 12/0873 |

* cited by examiner

*Primary Examiner* — Stephanie Wu
(74) *Attorney, Agent, or Firm* — Nicholson De Vos Webster & Elliott LLP

(57) ABSTRACT

A method for managing memory addresses in a memory subsystem is described. The method includes determining that a chunk of logical addresses is sequentially written such that a set of physical addresses mapped to corresponding logical addresses in the chunk are sequential. Thereafter, the memory subsystem updates an entry in a sequential write table for the chunk to indicate that the chunk was sequentially written and a compressed logical-to-physical (L2P) table based on (1) the sequential write table and (2) a full L2P table. The full L2P table includes a set of full L2P entries and each entry corresponds to a logical address in the chunk and references a physical address in the set of physical addresses. The compressed L2P table includes an entry that references a first physical address of the first set of physical addresses that is also referenced by an entry in the L2P table.

20 Claims, 14 Drawing Sheets

| COMPRESSED LOGICAL-TO-PHYSICAL (L2P) TABLE 502 | |
|---|---|
| LOGICAL ADDRESS 308 | PHYSICAL ADDRESS 310 |
| LOG_0 | PHY_1000 |
| LOG_128 | PHY_2000 |
| LOG_256 | PHY_50 |
| LOG_384 | PHY_0 |
| LOG_512 | PHY_88564 |
| LOG_640 | PHY_3026 |
| LOG_768 | PHY_68756 |
| LOG_896 | PHY_222222 |
| ... | ... |
| LOG_67108608 | PHY_33448866 |
| LOG_67108736 | PHY_6589752 |

GENERATING, MAINTAINING, OR UTILIZING A COMPRESSED LOGICAL-TO-PHYSICAL TABLE BASED ON SEQUENTIAL WRITES

CROSS-REFERENCE TO RELATED APPLICATION

The present application claims the benefit of U.S. Provisional Patent Application No. 62/992,542 filed on Mar. 20, 2020, which is hereby incorporated by reference.

TECHNICAL FIELD

The present disclosure generally relates to managing the mapping between logical and physical addresses, and more specifically, relates to generating, maintaining, and/or utilizing a compressed logical-to-physical table based on sequential writes.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 shows a compressed logical-to-physical table, which includes an entry for each chunk of logical addresses, in accordance with some embodiments of the present disclosure.

DETAILED DESCRIPTION

Figure 1:
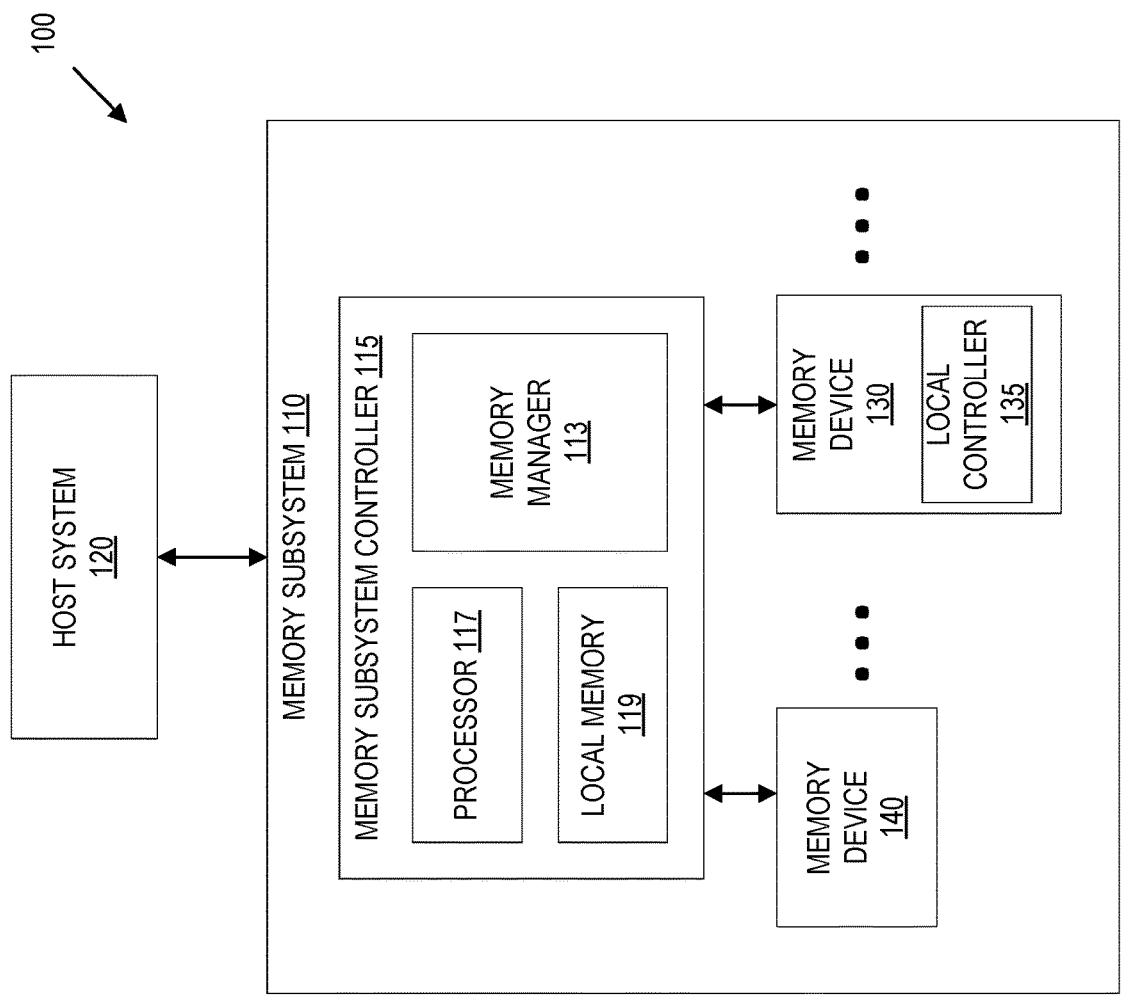
FIG. 1 illustrates an example computing system that includes a memory subsystem, in accordance with some embodiments of the present disclosure.

Aspects of the present disclosure are directed to a memory manager generating a compressed logical-to-physical table based on sequential writes to logical addresses in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be groups into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Memory subsystems often use a combination of logical addresses and physical addresses for performing memory operations (e.g., read and write operations). In particular, logical addresses are used by host systems for generating memory requests (e.g., read and write requests), whereas physical addresses are used by the memory subsystem to identify memory elements in a set of memory devices to fulfill the memory requests. To facilitate these multiple address spaces, the memory subsystem maintains a logical-to-physical table that maps logical addresses to physical addresses. For example, when the memory subsystem receives a write request from a host system that references a logical address, the memory subsystem locates a free memory element in an associated set of memory devices and writes data from the write request to this free memory element. Thereafter, the memory subsystem records a physical address of the memory element in an entry of the logical-to-physical table corresponding to the logical address of the write request. When a read request is received from the host system that references the same logical address, the memory subsystem retrieves the corresponding physical address from the entry in the logical-to-physical table corresponding to the logical address and performs a read operation using the retrieved physical address.

Based on the numerous logical addresses that can be used in the memory subsystem, the logical-to-physical table can be quite large with a potential size of several megabytes for a set of memory devices. With limited main memory, memory subsystems cannot load the entire logical-to-physical table into main memory during normal operation. Instead, the memory subsystem maintains the entire logical-to-physical table in a high-latency but abundant media (e.g., a non-volatile memory) and loads only a subset of the entries/mappings from the logical-to-physical table into a lower-latency, but more limited, main memory (e.g., a volatile memory). As the memory subsystem receives memory requests from the host system or memory requests are triggered internally, the memory subsystem swaps relevant portions of the logical-to-physical table into the lower-latency main memory from the higher-latency media to perform logical address to physical address translations (i.e., the memory subsystem swaps logical-to-physical address mapping into a logical-to-physical table cache). Further, for memory requests that include multiple logical addresses, the memory subsystem utilizes appropriate portions of the logical-to-physical table for performing translations for each logical address. Moving portions of the logical-to-physical table between media and performing multiple address translations per memory request adds considerable overhead, including latency, to fulfillment of the memory request.

Aspects of the present disclosure address the above and other deficiencies by generating a compressed logical-to-physical table to capture and exploit sequentially written chunks of logical addresses (e.g., sets of two or more logical addresses) for efficient fulfillment of read operations. In particular, the compressed logical-to-physical table maintains a subset of entries from the logical-to-physical table (sometimes referred to as the full logical-to-physical table) based on sequential writes to chunks of logical addresses as indicated by a sequential write table. Namely, the memory subsystem maintains a sequential write table that includes a set of entries (sometimes referred to as sequential write entries). Each sequential write entry is mapped to a designated chunk of logical addresses represented in the logical-to-physical table. For example, a first sequential write entry is mapped to a first chunk of N logical addresses, a second sequential write entry is mapped to a second chunk of N logical addresses, a third sequential write entry is mapped to a third chunk of N logical addresses, etc., where N is greater than or equal to two (e.g., N equals 32, 128, or 256). When the memory subsystem detects that the first chunk of N logical addresses has been sequentially written (e.g., the memory subsystem utilizes a single write operation to write data to sequential memory elements and corresponding physical addresses for the first chunk of N logical addresses such that corresponding physical addresses are sequential), the memory subsystem sets the first sequential write entry in the sequential write table to indicate that the first chunk of N logical addresses has been sequentially written (e.g., a bit of the first sequential write entry is set to one). Conversely, when the memory subsystem detects an operation that has caused the first chunk of N logical addresses to be non-sequentially written (i.e., the memory subsystem writes a subset of logical addresses in the first chunk of N logical addresses), the memory subsystem sets the first sequential write entry to indicate that the first set of N logical addresses has not been sequentially written (e.g., the bit of the first sequential write entry is set to zero).

Based on the sequential write table, the memory subsystem maintains a compressed logical-to-physical table. The compressed logical-to-physical table includes a subset of entries from the full logical-to-physical table and the memory subsystem uses the compressed logical-to-physical table to fulfill read requests to logical addresses that have been sequentially written. In particular, the compressed logical-to-physical table includes a single entry corresponding to each chunk of logical addresses that has been sequentially written. The single entry in the compressed logical-to-physical table for each chunk of logical addresses is equal to the first entry/mapping from the full logical-to-physical table for the chunk. For example, if the full logical-to-physical table includes 128 entries for a particular chunk of logical addresses that has been sequentially written (i.e., the chunk includes 128 logical addresses and the chunk of logical addresses has been sequentially written such that corresponding physical addresses are also sequential), the single entry in the compressed logical-to-physical table is identical to the first of the 128 entries in full logical-to-physical table. The memory subsystem can use these entries in the compressed logical-to-physical table to efficiently process read operations. For example, when the memory subsystem receives a read request that references a set of logical addresses, the memory subsystem determines, based on the sequential write table, if the set of logical addresses is part of a chunk of logical addresses that has been sequentially written. If the set of logical addresses is not part of a chunk of logical addresses that has been sequentially written, the memory subsystem translates each logical address using the full logical-to-physical table. However, if the set of logical addresses is part of a chunk of logical addresses that has been sequentially written, the memory subsystem translates only a first logical address (of the chunk of logical addresses) from the set using the compressed logical-to-physical table. Since the logical addresses in the chunk of logical addresses have been sequentially written, an indication of the first physical address based on a mapping in the compressed logical-to-physical table provides an indication of all the physical addresses mapped to the chunk of logical addresses within the set of logical addresses. The memory subsystem can determine each subsequent physical address by incrementing from the first physical address. In this fashion, the memory subsystem can efficiently perform address translation with potentially (1) limited memory utilization, as the compressed logical-to-physical table can be maintained entirely in low-latency media (e.g., volatile main memory) with minimal impact (both memory utilization and memory swapping overhead)

and (2) a limited number of address translations as only a single logical address in each chunk of logical addresses needs to be translated.

As used herein, a chunk of logical addresses is a set of two or more logical addresses or a plurality of logical addresses (e.g., two or more logical addresses). Accordingly, herein, a set of logical addresses or a plurality of logical addresses can be used in place of a chunk of logical addresses.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystem 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access the memory components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), dynamic random access memory (DRAM), and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem).

In general, the memory subsystem controller 115 can receive commands or operations from the host system 120 (e.g., read and write commands) and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes a memory manager 113 that can generate a sequential write table and compressed logical-to-physical table. In some embodiments, the controller 115 includes at least a portion of the memory manager 113. For example, the controller 115 can include a processor 117 (processing device) configured to execute instructions stored in local memory 119 for performing the operations described herein. In some embodiments, the memory manager 113 is part of the host system 110, an application, or an operating system.

The memory manager 113 can generate, maintain, and utilize a sequential write table and compressed logical-to-physical table to facilitate more efficient read operations. Further details with regards to the operations of the memory manager 113 are described below.

Figure 2:
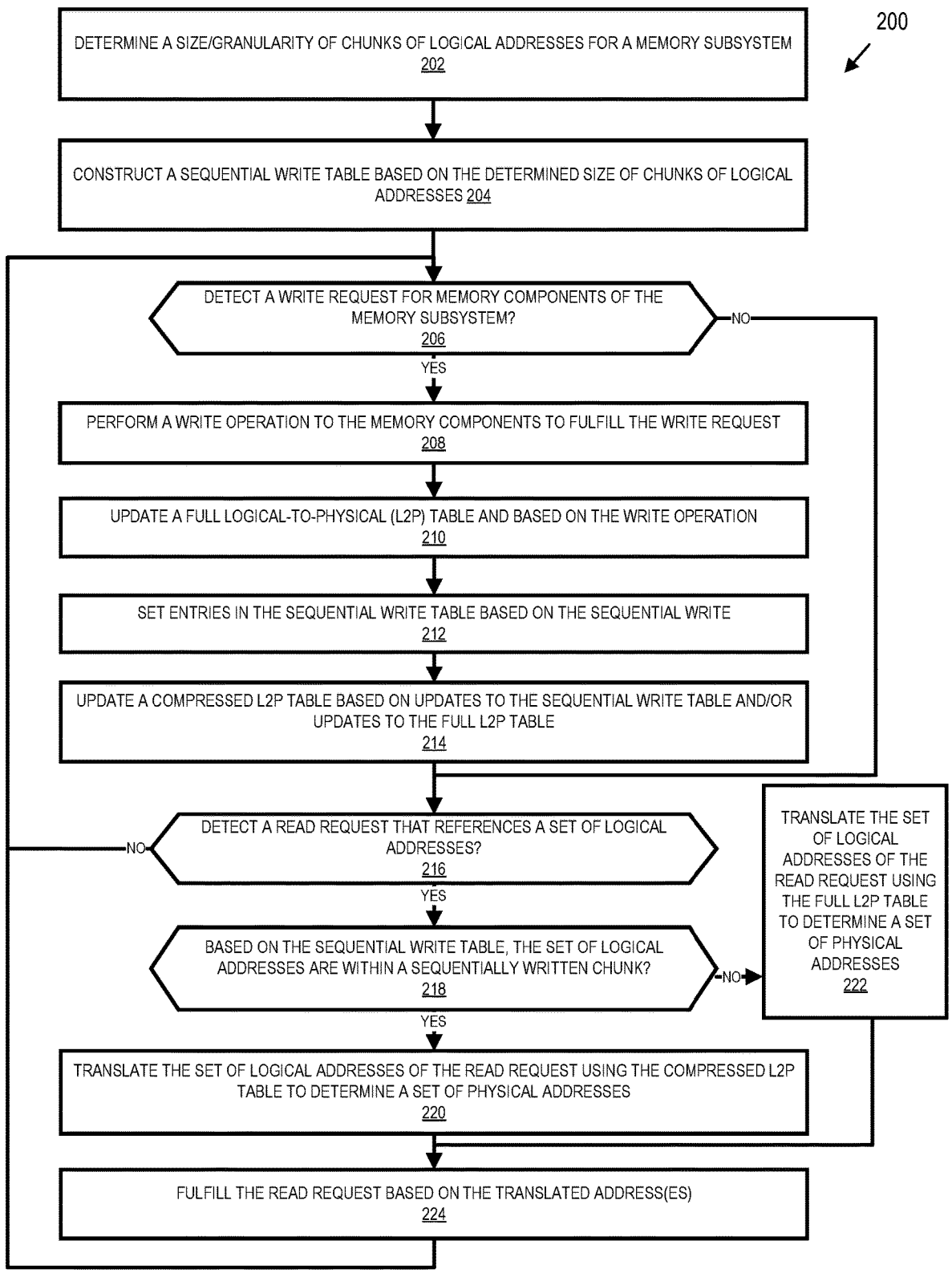
FIG. 2 is a flow diagram of an example method to generate, maintain, and utilize a sequential write table and a compressed logical-to-physical table, in accordance with some embodiments of the present disclosure.

FIG. 2 is a flow diagram of an example method 200 to generate, maintain, and utilize a sequential write table and a compressed logical-to-physical table, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the memory manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 202, the processing device determines a size (sometimes referred to as a granularity) of chunks of logical addresses for the memory subsystem 110. As used herein, a chunk is a group of two or more logical addresses (sometimes referred to as host addresses), which are used by the host system 120 to access data from the memory devices 130. In particular, each logical address is dynamically mapped to a physical address (sometimes referred to as logical block addresses (LBAs)), which is used for identifying a physical memory element (e.g., a quantity of physical memory such as a memory cell, a byte of memory, a kilobyte of memory, etc.) in the memory devices 130. The processing device can manage the mappings of logical addresses to physical addresses of memory elements in a logical-to-physical table. In some embodiments, the processing device determines the size of chunks (e.g., the number of logical addresses in a chunk) based on one or more of (1) a memory capacity of the memory subsystem 110 (i.e., a memory capacity of the memory devices 130) and/or (2) an expected workload of the memory subsystem 110. For example, the memory subsystem 110 can store memory management information associated with each chunk of logical addresses (e.g., a sequential write table, which will be described below). In particular, for each chunk of logical addresses, the memory subsystem 110 stores memory management information that describes the chunk of logical addresses. As the memory capacity of the memory subsystem 110 increases and without change to a size of chunks of logical addresses, the amount of space needed for memory management information similarly increases. However, the memory subsystem 110 could allocate a limited amount of space for storing all memory management information. In particular, the memory devices 130 could provide one gigabyte of storage space. Ideally, all of this storage space would be allocated for user data. However, management of the storage space (e.g., management of addresses) requires a certain amount of storage overhead, including storage for logical-to-physical tables or related information. For example, of the one gigabyte of storage space provided by the memory devices 130, the memory subsystem 110 could allocate 0.9 gigabytes for user data while the memory subsystem 110 could allocate the remaining 0.1 gigabytes for memory management information. Thus, the processing device determines a size of chunks of logical addresses such that corresponding memory management information can fit in the allocated space in the memory subsystem 110. For example, the processing device can set the granularity as a function of (1) the allocated space for memory management information and (2) the number of memory elements, logical addresses, and/or block sizes associated with the memory management information. For example, the processing device can determine a granularity of 128 kilobytes (KBs) (e.g., 128 logical addresses when each memory element is 1 KB), 256 KBs (e.g., 256 logical addresses when each memory element is 1 KB), or another granularity value at operation 202 to accommodate allocated storage space for associated memory management information in the memory subsystem 110.

As also indicated above, the processing device can determine the size of chunks of logical addresses based on an expected workload of the memory subsystem 110. For example, the processing device can determine the size of chunks based on an operating system and/or a type of device that the memory subsystem 110 is associated. For instance, when the memory subsystem 110 is integrated within or is otherwise operating with a mobile device (e.g., a mobile telephone or a tablet computer), the processing device can select a size for chunks of 128 KBs, which is below a maximum write granularity commonly used by several mobile operating systems (i.e., 512 KB). As will be discussed below, since the method 200 identifies writes to sequential logical addresses within a chunk of logical addresses, choosing a size for chunks of logical addresses above the permitted write size would result in a failure by the processing device to identify any writes to sequential logical addresses within a chunk. Accordingly, the processing device determines a size for chunks of logical addresses at or below the permitted write size. In another example, when the memory subsystem 110 is a cold-data optimized storage system (i.e., optimized for largely inactive data), the processing device can select a size for chunks of 512 KBs, as large write operations are more likely than small write operations. This larger size for chunks will in turn save space devoted to memory management information collectively for all chunks.

In some embodiments, the processing device can determine the size of chunks of logical addresses based on a predefined value. For example, a user, administrator, manufacturer, or designer of the memory subsystem 110 can select a size of chunks of logical addresses, which is stored in a memory of the memory subsystem 110 (e.g., the memory devices 130 or the local memory 119). In this case, the processing device determines the size of chunks of logical addresses by looking up the predefined/selected value from memory.

Figure 3:
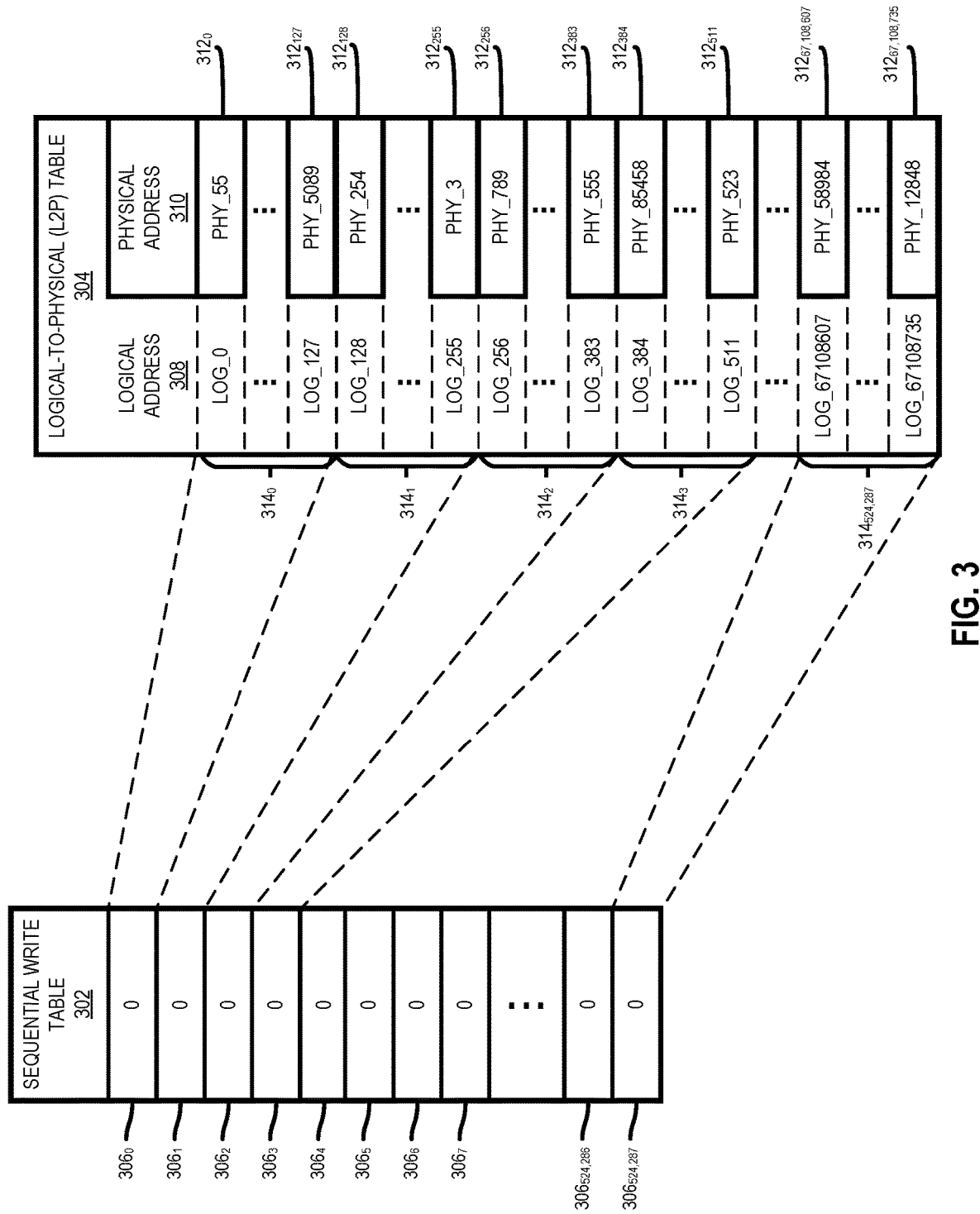
FIG. 3 shows a sequential write table along with an associated logical-to-physical table, in accordance with some embodiments of the present disclosure.

At operation 204, the processing device constructs a sequential write table or another data structure with entries to indicate whether chunks of logical addresses have been sequentially written. For example, the processing device constructs a sequential write table in volatile memory along with at least a portion of a logical-to-physical table. In one embodiment, the processing device constructs the sequential write table based on the determined size of chunks of logical addresses such that (1) the sequential write table includes a single bit for each chunk of logical addresses and (2) each bit in the sequential write table is initialized to a value of zero (i.e., each bit is unset). For example, FIG. 3 shows a sequential write table 302 along with an associated logical-to-physical table 304, according to one embodiment. As shown in FIG. 3, the logical-to-physical table 304 maps logical addresses 308, which are used by the host system 120 for memory requests (e.g., read and write requests), to physical addresses 310, which are used by the memory subsystem 110 to identify memory elements in the memory devices 130. In the example sequential write table 302 shown, each entry 306 of the sequential write table 302 (i.e., each bit) corresponds to a chunk 314 of logical addresses 308 from the logical-to-physical table 304. In particular, the example sequential write table 302 corresponds to memory devices 130 with a 64 gigabyte (GB) total capacity and the determined size for chunks 314 of logical addresses 308 from operation 202 is 128 KB with 1 KB memory elements, such that there are 524,288 entries $306_0$-$306_{524,287}$ in the sequential write table 302 and 67,108,736 entries $312_0$-$312_{67,108,735}$ in the logical-to-physical table 304 (sometimes referred to as full L2P entries 312 or full L2P table entries 312). Accordingly, the bit of entry $306_0$ corresponds to the chunk $314_0$ with the logical addresses LOG_0-LOG_127; the bit of entry $306_1$ corresponds to the chunk $314_1$ with the logical addresses LOG_128-LOG_255; the bit of entry $306_2$ corresponds to the chunk $314_2$ with the logical addresses LOG_256-LOG_383; etc.

As will be described in greater detail below, each entry 306 in the sequential write table 302 indicates whether the corresponding chunk 314 of logical addresses 308 were involved in a sequential write operation (e.g., a single write operation that writes to each logical address 308 in the chunk 314 or the physical addresses 310 associated with each logical address 308 in the chunk 314 are otherwise sequential), such that all physical addresses 310 associated with the logical addresses 308 in the chunk 314 are sequential. In particular, a value of one (i.e., a bit of an entry 306 is set) indicates that the logical addresses 308 of the corresponding chunk 314 were sequentially written. Conversely, a value of zero (i.e., a bit of an entry 306 is unset) indicates that the logical addresses 308 of the corresponding chunk 314 were not sequentially written.

In one embodiment, the processing device initializes each entry 306 to the unset value of zero, as the processing device is unaware of any write operations that preceded the performance of the method 200. However, in other embodiments, the processing device can initialize the sequential write table 302 based on a copy of the sequential write table 302 stored in non-volatile media or a status table that tracks write operations in relation to the memory devices 130. In some embodiments, the processing device performs the method 200 after the memory subsystem 110 is powered for the first time such that no write operations have been performed in relation to the memory devices 130 prior to commencement of the method 200. In some embodiments, a sequential write within a chunk 314 can be indicated in the logical-to-physical table 304 based on a sequential set of physical addresses 310 for a chunk 314. As shown in the logical-to-physical table 304 in FIG. 3, at least the last write operation involving the chunk $314_0$ was not a sequential write operation, as the physical addresses 310 for this chunk $314_0$ are non-sequential.

Although described above as each entry 306 in the sequential write table 302 including a single bit to indicate whether corresponding logical addresses 308 of a chunk 314 have been sequentially written, in other embodiments, each entry 306 can include additional or different information. For example, the indication as to whether corresponding logical addresses 308 of a chunk 314 have been sequentially written can be represented using different or more bits of data.

Further, in some embodiments, the memory subsystem 110 can utilize a logical-to-physical table cache that caches entries 312 in the full logical-to-physical table 304. In particular, the full logical-to-physical table 304 can be stored in high-latency memory while the logical-to-physical table cache resides in low-latency main memory (e.g., the local memory 119). As entries 312 are needed for translation, the memory subsystem 110 can swap entries 312 from the full logical-to-physical table 304 into the logical-to-physical table cache in main memory for use. Accordingly, the memory subsystem 110 can operation with a hierarchical set of logical-to-physical tables.

At operation 206, the processing device determines whether a write request directed to the memory devices 130 has been detected. For example, the processing device detects if a write request for the memory devices 130 has been received from the host system 120 or a write request has been internally triggered (e.g., a write request for wear leveling or garbage collection). The write request can indicate (1) a starting logical address 308 to begin a write operation; (2) a length, which indicates the number of logical addresses 308 involved in the write operation, and (3) data to be written to the memory devices 130. For instance, a write request could indicate a starting address of 0 (i.e., the starting logical address LOG 0); a length of 128 (i.e., 128 blocks or logical addresses 308, including the starting logical address 308); and 128 KB of data to be written to the memory devices 130 (e.g., a text string, image data, etc.). In response to the processing device detecting a write request at operation 206, the method 200 moves to operation 208.

At operation 208, the processing device writes the data from the write request to memory elements in the memory devices 130. As described herein, the memory devices 130 are a negative-and (NAND) type flash memory or another type of memory that does not facilitate in-place write operations (i.e., writing to memory elements without an intervening erase operation). As discussed above, the memory subsystem 110 can receive a first write request that references a set of logical addresses 308. In response to this first write request, the memory subsystem 110 locates sequential, free memory elements in the memory devices 130, which correspond to a first set of physical addresses 310, and writes the data to the free memory elements.

At operation 210, the processing device sets entries 312 in the logical-to-physical table 304 based on the write operation performed at operation 208. In particular, the memory subsystem 110 indicates the mapping between the set of logical addresses 308 of the first write request and the first set of physical addresses 310 by updating corresponding entries 312 in the logical-to-physical table 304. In response to a second write request that references the same set of logical addresses 308 from the first write request, the memory subsystem 110 cannot write to the first set of physical addresses 310 that were used to fulfill the first write request. Specifically, NAND-type flash memory and similar memory technologies require memory elements to be erased before a subsequent write operation. However, these types of memory require erase operations to be performed at a large granularity (i.e., a large number of memory elements in the memory devices 130 are involved in an erase operation). Accordingly, instead of performing an erase operation on a large swath of memory elements, including the previously written memory elements associated with the first set of physical addresses 310, the memory subsystem 110 performs a write operation to fulfill the second write request using a sequential set of free memory elements that correspond to a second set of physical addresses 310. The memory subsystem 110 indicates the mapping between the set of logical addresses 308 of the second write request, which were also referenced in the first write request, and the second set of physical addresses 310 of the memory elements that were used to fulfill the second write request by updating corresponding entries 312 in the logical-to-physical table 304 (i.e., by updating the same entries 312 that were updated in relation to the first write request but now with the second set of physical addresses 310). Based on the above, when the processing device performs a write operation in relation to a set of logical addresses 308, the processing device writes data to a set of free physical addresses 310 (e.g., physical addresses 310 that are not being used to store data and consequently are not currently referenced in the logical-to-physical table 304). Accordingly, at operation 210, the processing device updates entries 312 in the logical-to-physical table 304 for logical addresses 308 of the write operation to reference physical addresses 310 to which data was written.

At operation 212, the processing device sets entries 306 in the sequential write table 302 based on (1) chunks 314 of logical addresses 308 that were written sequentially and/or (2) chunks 314 of logical addresses 308 that were not written sequentially. As noted above, a chunk 314 is written sequentially when all logical addresses 308 in the chunk 314 are associated with a sequential set of physical addresses 310 such that each pair of logical addresses 308 in the chunk 314 of logical addresses 308 are associated with a sequential pair of physical addresses 310. For example, when the processing device uses a single write operation to write a chunk of logical addresses 308, the physical addresses 310 that are selected to fulfill the write operation will be sequential and the chunk 314 of logical addresses 308 are therefore sequentially written. In some cases, multiple writes to a chunk of logical addresses 308 can result in a sequential set of physical addresses 310. For example, the processing device could process a first write operation that references the logical addresses LOG_0-LOG_63 in the chunk $314_0$ that includes the logical addresses LOG_0-LOG_127. As a result of processing the first write operation, the processing device writes to the physical addresses PHY_100-PHY_163. Subsequently, the processing device could process a second write operation that references the logical addresses LOG_64-LOG_127 and as a result writes to the physical addresses PHY_164-PHY_227. Based on the first and second write operations, this chunk $314_0$, which includes the logical addresses LOG_0-LOG_127, can be considered sequentially written because the corresponding physical addresses 310 (i.e., the physical addresses PHY_100-PHY_227) are sequential. Accordingly, although described as a chunk 314 being sequentially written when a single write operation write the entire chunk 314, in some embodiments, the processing device can determine that a chunk 314 is sequentially written when physical addresses 310 associated with the logical addresses 308 of the chunk 314 are sequential, such that any pair of sequential logical addresses 308 are associated with physical addresses 310 that are also sequential.

Figure 4A:
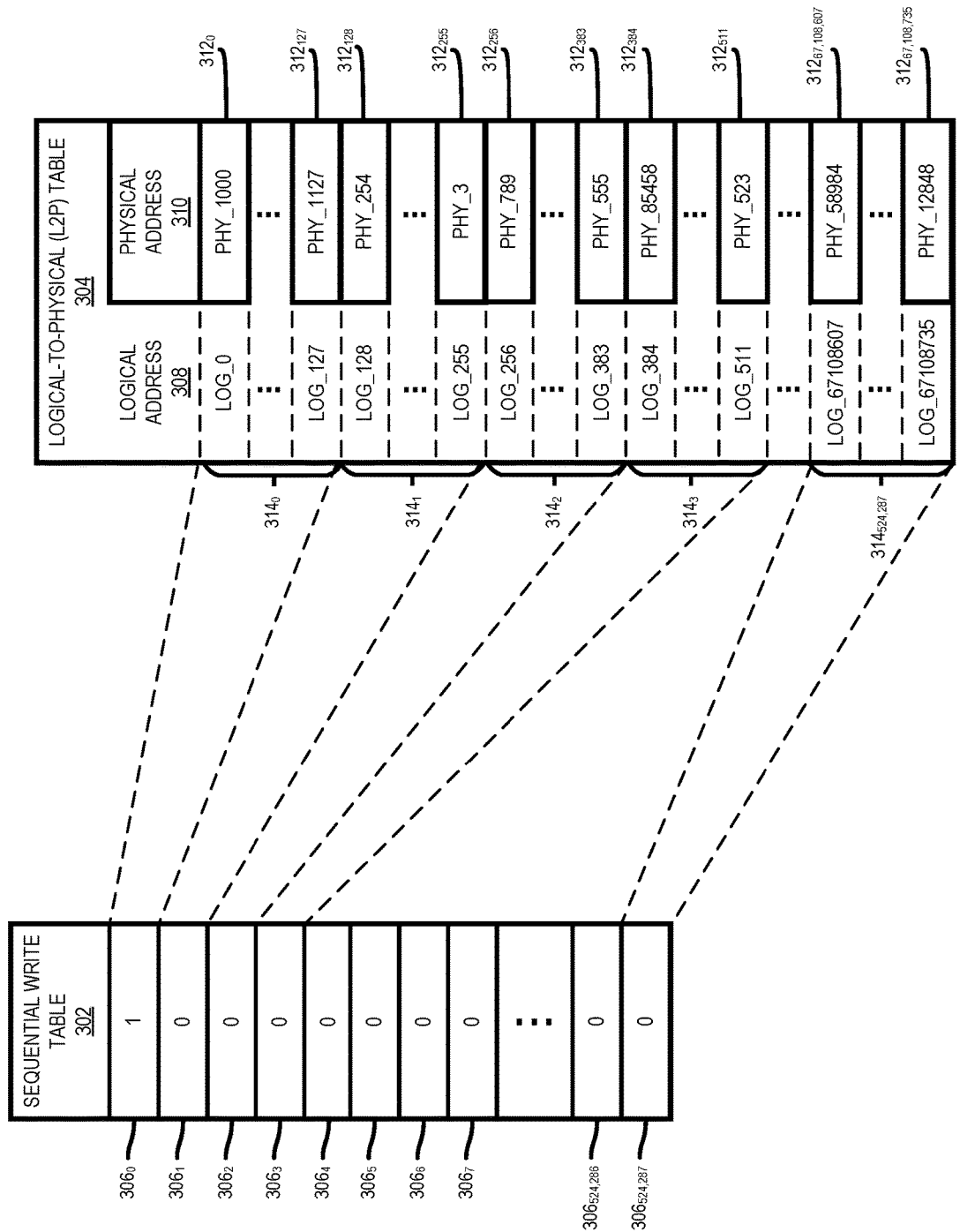
FIG. 4A shows the sequential write table along with the associated logical-to-physical table, which reflects a set of sequential writes to a first set of chunks of logical addresses, in accordance with some embodiments of the present disclosure.

In contrast to a chunk 314 that is sequentially written, a chunk 314 is written non-sequentially when a single write operation writes a subset of the logical addresses 308 in a chunk 314 such that at least one set of sequential logical addresses 308 in the chunk 314 are associated with physical addresses 310 that are not subject to the write operation. For example, when a single write operation writes at least the logical addresses LOG_0-LOG_127, which are the logical addresses 308 within the chunk $314_0$, the processing device selects a set of sequential, free physical addresses 310 for a write operation and determines that the chunk $314_0$ has been written sequentially. In response to the processing device determining that the chunk $314_0$ was written sequentially, the processing device sets the entry $306_0$ to the value one at operation 212. For example, FIG. 4A shows the sequential write table 302 and the logical-to-physical table 304 from FIG. 3, after the logical addresses LOG_0-LOG_127, which correspond to the chunk $314_0$, were written sequentially (as indicated by the sequential physical addresses PHY_1000-PHY_1127 in the entries $312_0$-$312_{127}$). As shown in FIG. 4A, in response to the processing device determining that the logical addresses 308 of the chunk $314_0$ were written sequentially, the processing device sets the entry $306_0$ in the sequential write table 302, which corresponds to the chunk $314_0$, to the value one at operation 212. Conversely, in response to the processing device determining that the logical addresses LOG_0-LOG_127 were not written sequentially (e.g., only a subset of logical addresses LOG_0-LOG_127 were the subject of the write operation), the processing device sets the entry $306_0$ to the value zero at operation 212. In the example provided in FIG. 3, the entry $306_0$ is already set to zero. Thus, the processing device would not modify the entry $306_0$ at operation 212 in response to determining that the logical addresses LOG_0-LOG_127 were not written sequentially.

Figure 4B:
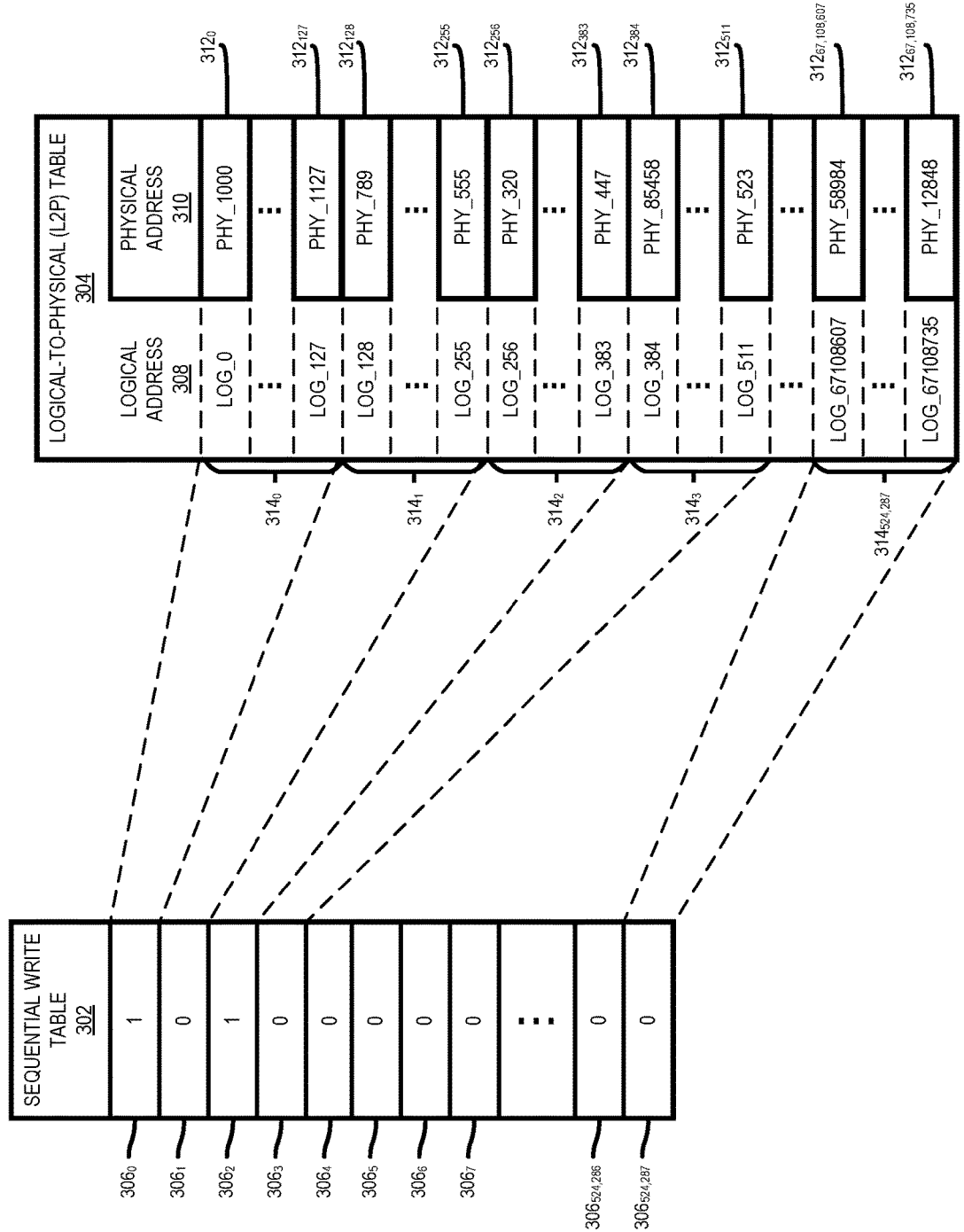
FIG. 4B shows the sequential write table along with the associated logical-to-physical table, which reflects a set of sequential writes to a second set of chunks of logical addresses, in accordance with some embodiments of the present disclosure.

FIG. 4B shows the sequential write table 302 and the logical-to-physical table 304 from FIG. 4A after a write operation to the logical addresses LOG_256-LOG_383, which are the logical addresses 310 for the chunk $314_2$. In particular, the processing device determines that the chunk $314_2$ has been written sequentially and sets the entry $306_2$, which corresponds to the chunk $314_1$, to the value one at operation 212, as shown in FIG. 4B.

Figure 4C:
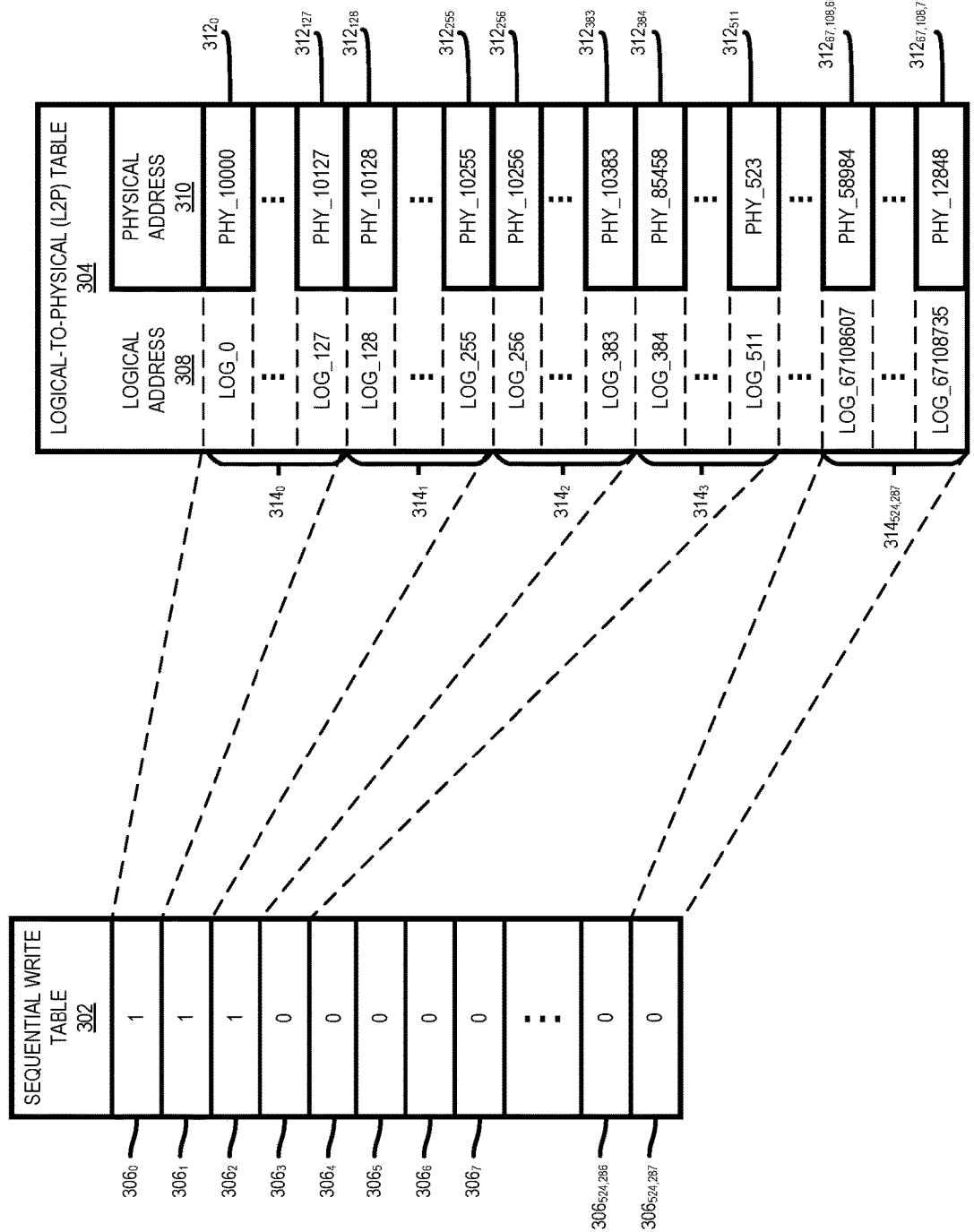
FIG. 4C shows the sequential write table along with the associated logical-to-physical table, which reflects a set of sequential writes to a third set of chunks of logical addresses, in accordance with some embodiments of the present disclosure.

In some cases, multiple chunks 314 can be sequentially written based on a single write operation. For example, when a single write operation writes all the logical addresses LOG_0-LOG_383, which are the logical addresses 308 within the chunks $314_0$, $314_1$, and $314_2$, the processing device determines that the chunks $314_0$, $314_1$, and $314_2$ have been written sequentially. In response to the processing device determining that the chunks $314_0$, $314_1$, and $314_2$ were written sequentially, the processing device sets the entry $306_0$, which corresponds to the chunk $314_0$, to the value one; sets the entry $306_1$, which corresponds to the chunk $314_1$, to the value one; and sets the entry $306_2$, which corresponds to the chunk $314_2$, to the value one at operation 212. FIG. 4C shows the sequential write table 302 and the logical-to-physical table 304 from FIG. 4B after a write operation to the logical addresses LOG_0-LOG_383. As shown, the processing device has set the entry $306_1$ to the value one and maintains the entries $306_0$ and $306_2$ at the value one to indicate the chunks $314_0$, $314_4$ and $314_2$ are each currently written sequentially.

Figure 4D:
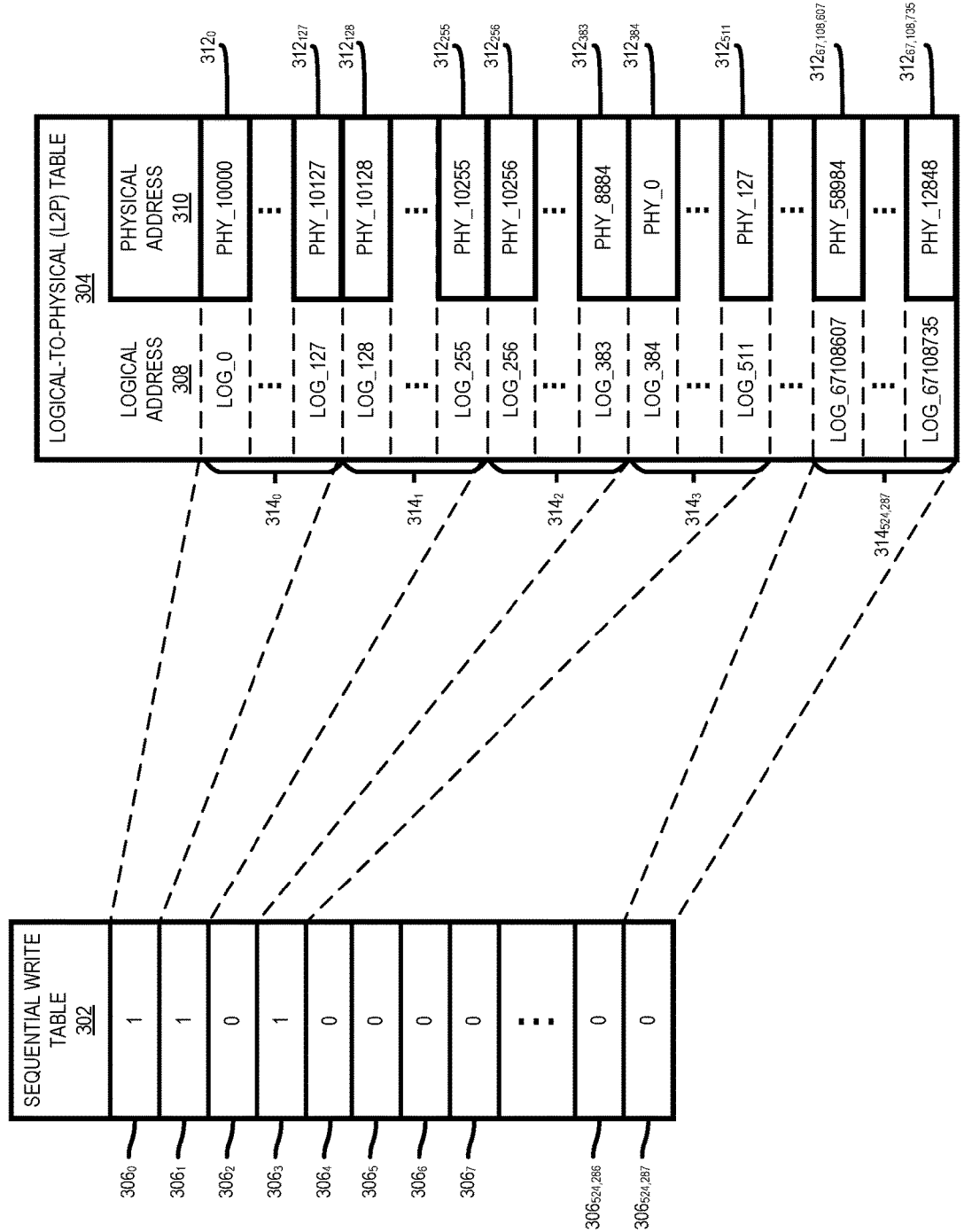
FIG. 4D shows the sequential write table along with the associated logical-to-physical table, which reflects a set of sequential writes to a fourth set of chunks of logical addresses, in accordance with some embodiments of the present disclosure.

In some cases, a single write operation can sequentially write logical addresses 308 in one chunk 314 and cause a non-sequential write to logical addresses 308 in another chunk 314. For example, a write operation that starts at the logical address LOG_312 and extends through the logical address LOG_511 has sequentially written the logical addresses 308 in the chunk $314_3$ (e.g., the logical addresses LOG_384-LOG_511) and caused the logical addresses 308 in the chunk $314_2$ to be non-sequentially written (e.g., the logical addresses LOG_312-LOG_383 were written based on the current write operation but the other logical addresses 308 in the chunk $312_2$, logical addresses LOG_256-LOG_311, were not written based on this write operation). Accordingly, the physical addresses 310 associated with the logical addresses LOG_256-LOG_311 (via the logical-to-physical mapping) are not sequential with the physical addresses 310 associated logical addresses LOG_312-LOG_383. In response to the processing device determining that the logical addresses 308 in the chunk $314_3$ were written sequentially but the logical addresses 308 in the chunk $314_2$ were not written sequentially, the processing device sets the entry $306_3$ to the value one and sets the entry $306_2$ to the value zero at operation 212. For example, FIG. 4D shows the sequential write table 302 and the logical-to-physical table 304 from FIG. 4C after a write operation to the logical addresses LOG_312-LOG_511. As shown, the processing device has set the entry $306_2$ to zero to indicate that the chunk $314_2$ is not currently written sequentially and set the entry $306_3$ to one to indicate the chunk $314_3$ is currently written sequentially.

Figure 5A:
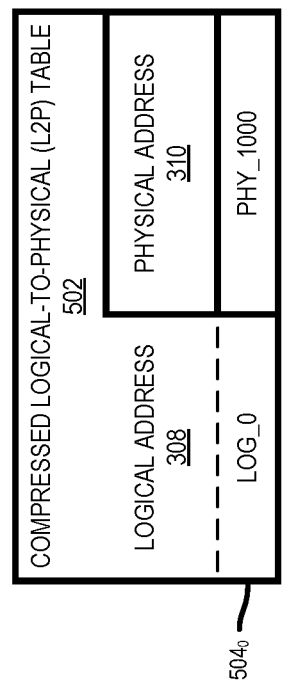
FIG. 5A shows a compressed logical-to-physical table, which includes a single entry corresponding to a single sequentially written chunk of logical addresses, in accordance with some embodiments of the present disclosure.

At operation 214, the processing device updates a compressed logical-to-physical table based on any updates to the sequential write table 302 and/or updates to the logical-to-physical table 304. A compressed logical-to-physical table is a table, which like the full logical-to-physical table 304, maps logical addresses 308 to physical addresses 310. However, in contrast to the full logical-to-physical table 304, the compressed logical-to-physical table only includes entries for chunks 314 of logical addresses 308 that have been sequentially written. For example, FIG. 5A shows a compressed logical-to-physical table 502 according to one embodiment. This compressed logical-to-physical table 502 illustrates an example entry 504 that corresponds to the states of the sequential write table 302 and the full logical-to-physical table 304 as illustrated in FIG. 4A. In particular, the compressed logical-to-physical table 502 shown in FIG. 5A includes one entry $504_0$, which corresponds to the one chunk 314 that the sequential write table 302 of FIG. 4A indicates is currently sequentially written. Specifically, the entry $504_0$ includes the first entry/mapping 312 from the full logical-to-physical table 304 for the sequentially written chunk $314_0$ (i.e., the physical address PHY_1000 associated with the logical address LOG_0). Since all logical addresses 308 in the chunk $314_0$ have been sequentially written such that associated physical addresses 310 are sequential as described above, this single logical address to physical address mapping indicates the physical address 310 for every other logical address 308 in the chunk $314_0$. Namely, all other logical address to physical address mappings can be directly indexed based on incrementing this first logical address to physical address mapping for this chunk $314_0$.

Figure 5B:
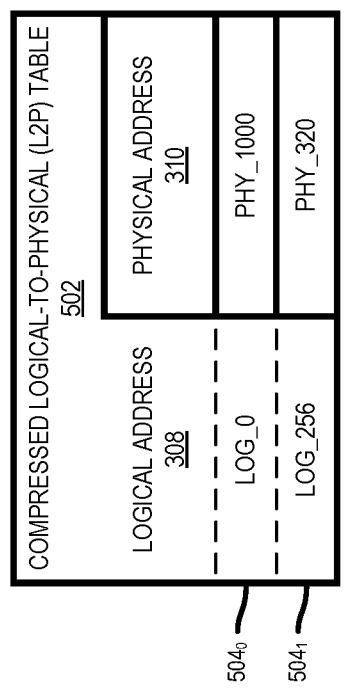
FIG. 5B shows a compressed logical-to-physical table, which includes two entries corresponding to two sequentially written chunks of logical addresses, in accordance with some embodiments of the present disclosure.

FIG. 5B shows the compressed logical-to-physical table 502 according to another example embodiment. These compressed logical-to-physical table 502 entries 504 correspond to the sequential write table 302 and the full logical-to-physical table 304 of FIG. 4B. In particular, the compressed logical-to-physical table 502 shown in FIG. 5B includes two entries $504_0$ and $504_1$, which correspond to the chunks 314 that the sequential write table 302 of FIG. 4B indicate have been sequentially written. Specifically, the entry $504_0$ includes the first entry/mapping $312_0$ from the full logical-to-physical table 304 for the sequentially written chunk $314_0$, and the entry $504_1$ includes the first entry/mapping $312_{256}$ from the full logical-to-physical table 304 for the sequentially written chunk $314_2$.

Figure 5C:
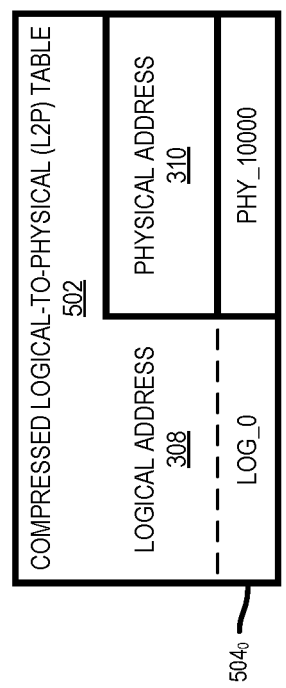
FIG. 5C shows a compressed logical-to-physical table, which includes a single entry corresponding to three sequentially written chunks of logical addresses, in accordance with some embodiments of the present disclosure.

In some embodiments, a set of entries 504 in the compressed logical-to-physical table 502 can be combined into a single entry 504. In particular, a single entry 504 in the compressed logical-to-physical table 502 can represent multiple adjacent chunks 314 that have been sequentially written. For example, FIG. 5C shows a compressed logical-to-physical table 502 corresponding to the sequential write table 302 and the full logical-to-physical table 304 of FIG. 4C. As shown, the compressed logical-to-physical table 502 includes a single entry $504_0$ that represents the sequentially written chunks $314_0$-$314_2$. Accordingly, the processing device combined the entries $504_0$ and $504_1$ from FIG. 5B, corresponding to the chunks $314_0$ and $314_2$, respectively, at operation 214 based on the sequential write to the chunks $314_0$, $314_1$, and $314_2$. Although the compressed logical-to-physical table 502 of FIG. 5A is similar to the compressed logical-to-physical table 502 of FIG. 5C (as both instances of the compressed logical-to-physical table 502 include a single entry 504), the processing device can interpret these tables 502 differently based on the sequential write table 302. By reviewing the sequential write tables 302, the processing device detects that (1) the entry $504_0$ in the compressed logical-to-physical table 502 of FIG. 5A corresponds to only the sequentially written chunk $314_0$ as the entry $306_0$ in the sequential write table 302 of FIG. 4A is set without any adjacent entries 306 being set and (2) the entry $504_0$ in the compressed logical-to-physical table 502 of FIG. 5C corresponds to the sequentially written chunks $314_0$-$314_2$ as the sequential set of entries $306_0$-$306_2$ in the sequential write table 302 of FIG. 4C are all set without corresponding entries 504 in the compressed logical-to-physical table 502 for the entries $306_1$-$306_2$ in the sequential write table 302.

As described above, entries 504 in the compressed logical-to-physical table 502 can be combined into a single entry 504. In one embodiment, this combination can occur when (1) two or more sequentially written chunks 314 are separated by one or more intervening chunks 314 that were previously not sequentially written, (2) the one or more intervening chunks 314 have now been sequentially written, and (3) the writing of the one or more intervening chunks 314 has caused all the physical addresses 310 mapped to the logical addresses 308 in the combination of the two or more originally sequentially written chunks 314 and the one or more intervening chunks 314 to be sequential such that any two sequential logical addresses 308 from these chunks 314 are mapped to sequential physical addresses 310.

Figure 5D:
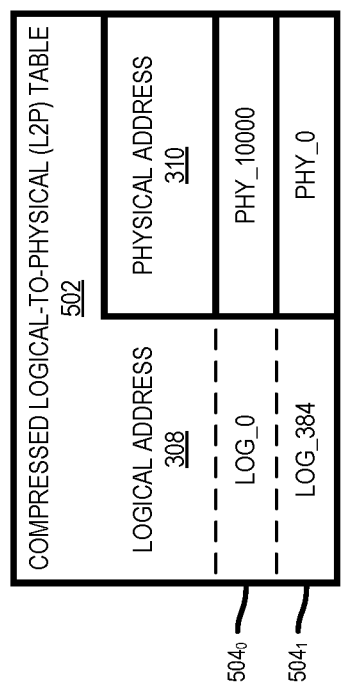
FIG. 5D shows a compressed logical-to-physical table, which includes two entries corresponding to three sequentially written chunks of logical addresses, in accordance with some embodiments of the present disclosure.

FIG. 5D shows the compressed logical-to-physical table 502 corresponding to the sequential write table 302 and the logical-to-physical table 304 of FIG. 4D. As shown in FIG. 5D, the compressed logical-to-physical table 502 includes two entries $504_0$ and $504_1$. The processing device generated this set of entries $504_0$ and $504_1$ at operation 214 in response to the processing device detecting that the set of sequentially written chunks $314_0$-$314_2$ was broken with the non-sequential writing of the chunk $314_2$ but with the addition of the sequential written chunk $314_3$. Accordingly, the entry $504_0$ corresponds to the sequentially written chunks $314_0$ and $314_1$ while the entry $504_1$ corresponds to the sequentially written chunk $514_3$.

In some embodiments, the compressed logical-to-physical table 502 includes a field for logical addresses 308 such that an association with a mapping indicated by the field for physical addresses 310 is explicitly provided. In other embodiments, the compressed logical-to-physical table 502 does not include a field for logical addresses 308, and an association with a mapping indicated by the field for physical addresses 310 is implicitly provided by the sequential write table 302. Namely, the processing device determines the association of entries 504 in the compressed logical-to-physical table 502 and logical addresses 308 based on entries 306 in the sequential write table 302. For example, when the first "1" in the sequential write table 302 is for the entry $306_3$, the processing device can determine that the first entry $504_0$ in the compressed logical-to-physical table 502 is associated with the chunk $314_3$.

Although shown as the compressed logical-to-physical table 502 including a variable number of entries 504, in some embodiments, the compressed logical-to-physical table 502 includes a separate entry 504 for each chunk 314, as shown in FIG. 6. In particular, the compressed logical-to-physical table 502 includes an entry 504 for each chunk 314 of logical addresses 308, which corresponds to the logical address to physical address mapping for the first logical address 308 in each respective chunk 314. However, the processing device only utilizes each entry 504 when a corresponding entry 306 in the sequential write table 302 is set. Despite having an entry 504 for each chunk 314 regardless whether the entry 504 will be used, the compressed logical-to-physical table 502 still offer a memory savings in comparison to the full logical-to-physical table 304 by only including a single entry 504 for each chunk 314 instead of an entry 312 for each logical address 308 in a chunk 314. Although shown as each entry 504 in the compressed logical-to-physical table 502 referencing a physical address 310, in some embodiments in which a corresponding chunk 314 is not sequentially written, the entry 504 in the compressed logical-to-physical table 502 can have an unmapped state (i.e., includes a predefined unmapped value) to indicate that the chunk 314 is not sequentially written.

As can be seen from the compressed logical-to-physical tables 502 of FIGS. 5A-5D and 6, a sequentially written chunk 314 results in a reduction in the number of entries/mappings that are necessary to identify all physical addresses 310 mapped to logical addresses 308 within the sequentially written chunk 314. Accordingly, as will be described below, when a read request is received corresponding to a sequentially written chunk 314, an entry 504 in the compressed logical-to-physical table 502 can be used in place of multiple entries 312 in the full logical-to-physical table 304, which the processing device can swap into a logical-to-physical table cache for use. The use of the compressed logical-to-physical table 502 reduces the amount of low-latency memory needed and consequent swaps from high-latency memory, as the compressed logical-to-physical table 502 is greatly reduced in size in comparison to the full logical-to-physical table 304. Further, use of the compressed logical-to-physical table 502 requires fewer translations to fulfill a read request as only a single translation is needed per sequentially written chunk 314.

Following operation 214 or a determination that a write request was not detected at operation 206, the method 200 moves to operation 216. At operation 216, the processing device determines if a read request was detected (e.g., a read request received from the host system 120). In response to the processing device determining that a read request was not detected at operation 216, the method 200 returns to operation 206 to again determine if a write request has been detected. Conversely, in response to the processing device determining that a read request was detected at operation 216, the method 200 moves to operation 218.

At operation 218, the processing device determines if the read request corresponds to a sequentially written chunk 314 based on the sequential write table 302. In particular, the read request includes a set of logical addresses 308. Using this set of logical addresses 308, the processing device queries/indexes into the sequential write table 302 to determine if a corresponding chunk 314 was sequentially written (i.e., whether an entry 306 in the sequential write table 302 indicates that the set of logical address 308 was sequentially written). In response to determining that the set of logical addresses 308 were sequentially written, the method 200 moves to operation 220.

At operation 220, the processing device translates the set of logical addresses 308 from the read request using the compressed logical-to-physical table 502. In particular, the processing device translates a single logical address 308 from the set of logical addresses 308 of the read request using an entry 504 in the compressed logical-to-physical table 502 to determine an initial physical address 310 for this logical address 308. The processing device ascertains physical addresses 310 for the remaining logical addresses 308 of the set of logical addresses based on the initial physical address 310. Namely, since the set of logical addresses 308 map to a chunk 314 that was sequentially written, the other physical addresses 310 are sequential with the initial physical address 310 such that incrementing the initial physical address 310 indicates the remaining physical addresses 310 for respective remaining logical addresses 308. Accordingly, a single translation is needed using the compressed logical-to-physical table 502 to determine a set of physical addresses 310 corresponding to the set of logical addresses 308 from the read request. Further, since the compressed logical-to-physical table 502 is small relative to the full logical-to-physical table 304, the compressed logical-to-physical table 502 can remain in main memory and without need to swap in from a higher-latency memory.

Returning to operation 218, in response to the processing device determining that the set of logical addresses 308 were not sequentially written, the method 200 moves to operation 222. At operation 222, the processing device translates the set of logical addresses 308 from the read request using the full logical-to-physical table 304 and/or a logical-to-physical table cache that stores recently used mappings from the full logical-to-physical table 304. In particular, the processing device swaps appropriate portions of the full logical-to-physical table 304 into low-latency main memory (when the needed mappings/entries are not already present in the full logical-to-physical table 304) and translates each logical address 308 in the set of logical addresses 308 to determine a corresponding set of physical addresses 310. Accordingly, the processing device performs a translation for each logical address 308 in the set of logical addresses 308 from the read request.

Although described above as performing either operation 220 or operation 222, in some cases, both the operations 220 and 222 can be performed for a single read request. In particular, in response to a set of logical addresses 308 of a read request that includes logical addresses 308 in sequentially written chunks 314 and logical addresses 308 in non-sequentially written chunks 314, each of the operations 220 and 222 can be performed for respective logical addresses 308 to determine a corresponding set of physical addresses 310 for the set of logical addresses 308 for the read request.

Following operation 220 and/or operation 222, the method 200 moves to operation 224. At operation 224, the processing device performs a read operation using the determined set of physical addresses 310 from operations 220 and/or 222. In particular, the processing device reads data memory elements from the memory devices 130 corresponding to the determined set of physical addresses 310 and returns the data to the requesting party (e.g., the host system 120).

As described herein, the memory subsystem 110 can utilize a compressed logical-to-physical table 502 to improve processing of read requests. In particular, the compressed logical-to-physical table 502 offers (1) a reduced memory footprint and (2) an increased hit rate for logical addresses 308 of a read request that target sequentially written chunks 314, as the memory subsystem 110 can maintain the low-memory-consuming compressed logical-to-physical table 502 entirely in main memory. Further, the performance improvement provided by the compressed logical-to-physical table 502 can be achieved with minimal impact on non-sequentially written chunks 314 as the memory subsystem 110 can operate concurrently with a full logical-to-physical table 304.

Figure 7:
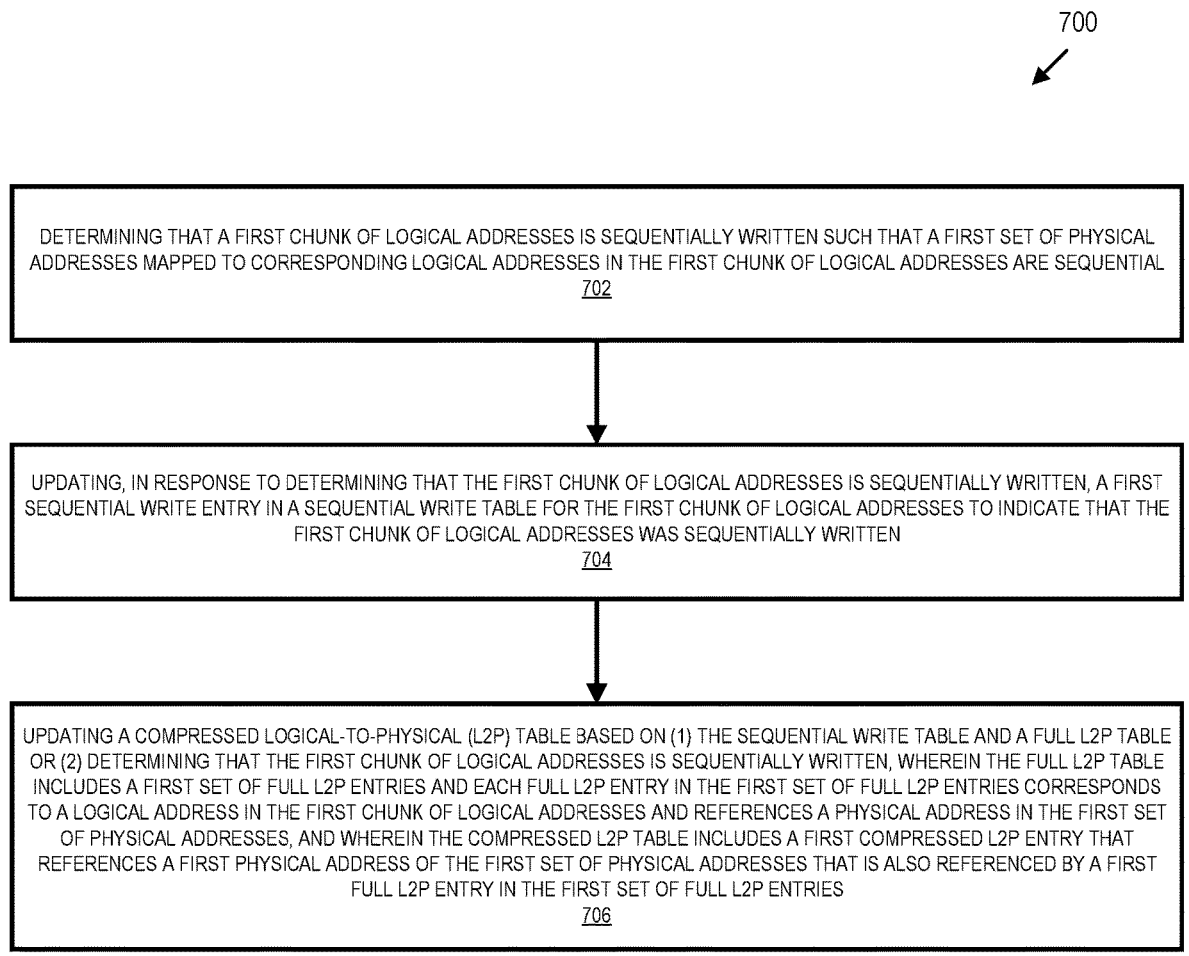
FIG. 7 is a flow diagram of another example method to generate, maintain, and utilize a sequential write table and a compressed logical-to-physical table, in accordance with some embodiments of the present disclosure.

FIG. 7 is a flow diagram of another example method 700 to generate, maintain, and utilize a sequential write table and a compressed logical-to-physical table, in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the memory manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 702, the processing device determines that a first chunk 314 of logical addresses 308 is sequentially written such that a first set of physical addresses 310 mapped to corresponding logical addresses 308 in the first chunk 314 of logical addresses 308 are sequential. In one embodiment, a chunk 314 of logical addresses 308 is sequentially written when the chunk 314 of logical addresses 308 is associated with a sequential set of physical addresses 310 such that each sequential pair of logical addresses 308 in the chunk 314 of logical addresses 308 is associated with a sequential pair of physical addresses 310.

At operation 704, the processing device updates, in response to determining that the first chunk 314 of logical addresses 308 is sequentially written, a first sequential write entry 306 in a sequential write table 302 for the first chunk 314 of logical addresses 308 to indicate that the first chunk 314 of logical addresses 308 was sequentially written.

At operation 706, the processing device updates a compressed L2P table 502 based on (1) the sequential write table 302 and (2) a full L2P table 304. The full L2P table 304 includes a first set of full L2P entries 312, and each full L2P entry 312 in the first set of full L2P entries 312 corresponds to a logical address 308 in the first chunk 314 of logical addresses 308 and references a physical address 310 in the first set of physical addresses 310. The compressed L2P table 502 includes a first compressed L2P entry 504 that references a first physical address 310 of the first set of physical addresses that is also referenced by a first full L2P entry 312 in the first set of full L2P entries 312. In one embodiment, the compressed L2P table 502 consists of a number of compressed L2P entries 504 that is equal to the number of chunks 314 of logical addresses 308 that are sequentially written. In another embodiment, the compressed L2P table 502 consists of a number of chunks 314 of logical addresses 308 represented in the full L2P table 312.

Figure 8:
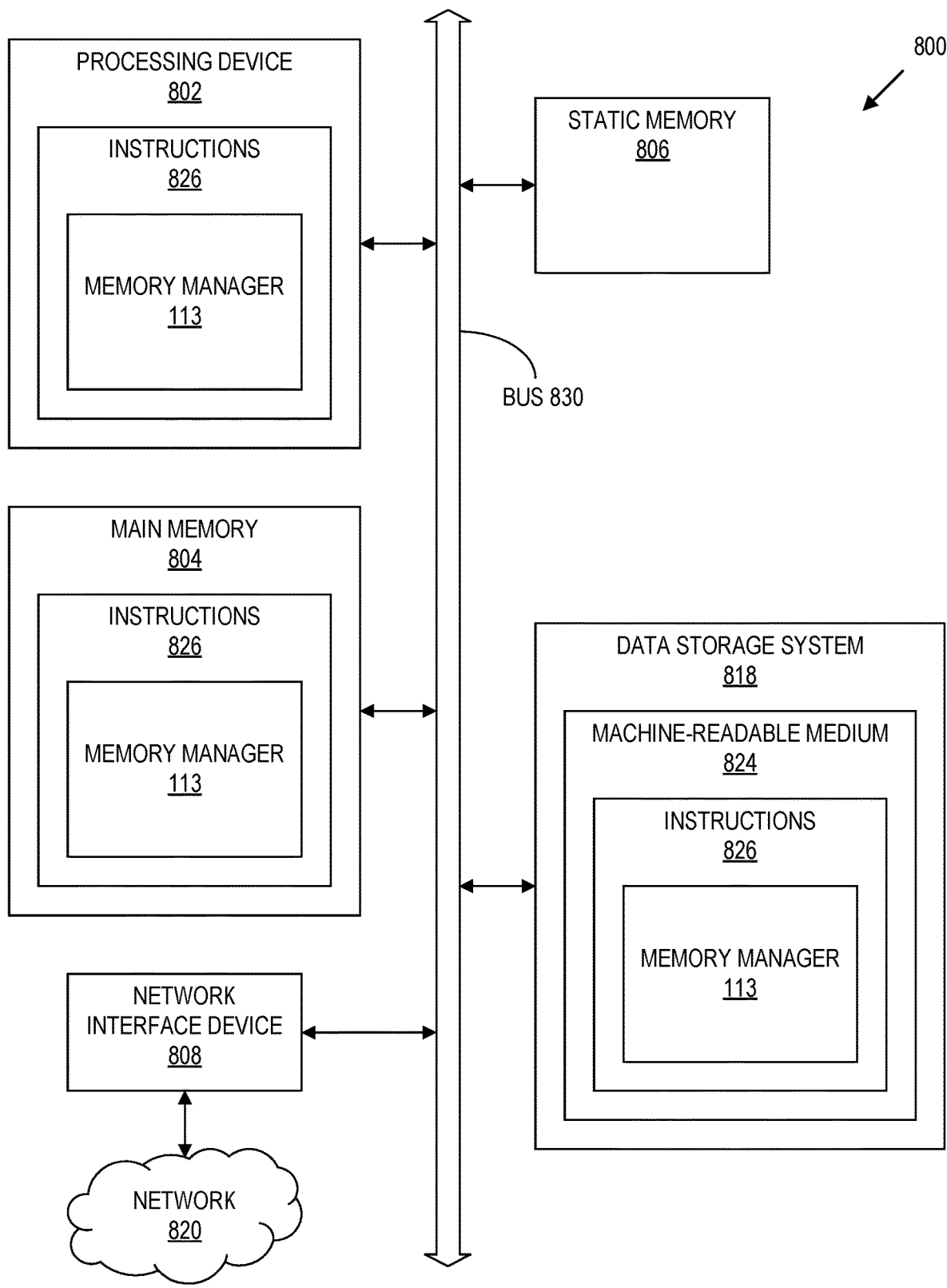
FIG. 8 is a block diagram of an example computer system in which embodiments of the present disclosure may operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the memory manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory subsystem 110 of FIG. 1.

In one embodiment, the instructions 826 include instructions to implement functionality corresponding to a memory manager (e.g., the memory manager 113 of FIG. 1). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented method 200 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method for managing memory addresses in a memory subsystem, the method comprising:
    determining that a first chunk of logical addresses is sequentially written such that a first set of physical addresses mapped to corresponding logical addresses in the first chunk of logical addresses are sequential;
    updating, in response to determining that the first chunk of logical addresses is sequentially written, a first sequential write entry in a sequential write table for the first chunk of logical addresses to indicate that the first chunk of logical addresses was sequentially written;
    updating a compressed logical-to-physical (L2P) table based on (1) the sequential write table and (2) a full L2P table,
    wherein the full L2P table includes a first set of full L2P entries and each full L2P entry in the first set of full L2P entries corresponds to a logical address in the first chunk of logical addresses and references a physical address in the first set of physical addresses, and
    wherein the compressed L2P table includes a first compressed L2P entry that references a first physical address of the first set of physical addresses that is also referenced by a first full L2P entry in the first set of full L2P entries;
    determining whether the first chunk of logical addresses are sequential with a second chunk of logical addresses and whether the first set of physical addresses are sequential with a second set of physical addresses; and
    in response to determining the first chunk of logical addresses is not sequential with a second chunk of logical addresses or determining a second set of physical addresses are not sequential with the first set of physical addresses, updating the compressed L2P table by adding a second compressed L2P entry to the compressed L2P table for the second chunk of logical addresses,
    wherein the second compressed L2P entry is set to reference a first physical address of the second set of physical addresses that is also referenced by a first full L2P entry in the second set of full L2P entries.

2. The method of claim 1, wherein the compressed L2P table consists of a number of compressed L2P entries that is equal to the number of chunks of logical addresses that are sequentially written,
    wherein a chunk of logical addresses is sequentially written when the chunk of logical addresses is associated with a sequential set of physical addresses such that each sequential pair of logical addresses in the chunk of logical addresses is associated with a sequential pair of physical addresses.

3. The method of claim 1, wherein the compressed L2P table consists of a number of chunks of logical addresses represented in the full L2P table.

4. The method of claim 1, further comprising:
    detecting a first read request that references one or more logical addresses in the first chunk of logical addresses;
    determining based on the sequential write table, whether the first chunk of logical addresses is sequentially written; and
    fulfilling the first read request based on the first compressed L2P entry in the compressed L2P table in response to determining that the first chunk of logical addresses is sequentially written.

5. The method of claim 1, further comprising:
    detecting a first read request that references one or more logical addresses in the first chunk of logical addresses;
    determining based on the sequential write table, whether the first chunk of logical addresses is sequentially written; and
    fulfilling the first read request based on the first set of full L2P entries in the full L2P table in response to determining that the first chunk of logical addresses is not sequentially written.

6. The method of claim 1, further comprising:
    determining that the second chunk of logical addresses is sequentially written such that a second set of physical addresses mapped to corresponding logical addresses in the second chunk of logical addresses are sequential;
    updating a second sequential write entry in the sequential write table for the second chunk of logical addresses to indicate that the second chunk of logical addresses was sequentially written; and
    updating the compressed L2P table based on (1) the second sequential write entry and (2) the full L2P table,
    wherein the full L2P table includes a second set of full L2P entries and each full L2P entry in the second set of full L2P entries corresponds to a logical address in the second chunk of logical addresses and references a physical address in the second set of physical addresses.

7. The method of claim 6, in response to determining the first chunk of logical addresses is sequential with the second chunk of logical addresses and the second set of physical addresses are sequential with the first set of physical addresses, updating the compressed L2P table by updating the first compressed L2P entry to reference a last logical address in the second chunk of logical addresses.

8. The method of claim 6, further comprising:
detecting a second read request that references one or more logical addresses in the second chunk of logical addresses;
determining based on the sequential write table, that the second chunk of logical addresses is sequentially written; and
fulfilling the second read request based on the second compressed L2P entry in the compressed L2P table when the first chunk of logical addresses is not sequential to the second chunk of logical addresses or the second set of physical addresses are not sequential with the first set of physical addresses and in response to determining that the second chunk of logical addresses is sequentially written.

9. The method of claim 6, further comprising:
detecting a second read request that references one or more logical addresses in the second chunk of logical addresses;
determining based on the sequential write table, that the second chunk of logical addresses is sequentially written; and
fulfilling the second read request based on the first compressed L2P entry in the compressed L2P table when the first chunk of logical addresses is sequential with the second chunk of logical addresses and in response to determining that the second chunk of logical addresses is sequentially written.

10. The method of claim 1, further comprising:
detecting a write request that references a first subset of logical addresses in the first chunk of logical addresses;
writing a second set of physical addresses in memory devices of the memory subsystem;
updating the full L2P table to associate the first subset of logical addresses with the second set of physical addresses such that the first subset of logical addresses is associated with the second set of physical addresses and a second subset of logical addresses in the first chunk of logical addresses is associated with a third set of physical addresses, and the first set of physical addresses is not sequential with the third set of physical addresses;
updating the sequential write table to indicate that the first chunk of logical addresses is not sequentially written; and
removing the first compressed L2P entry from the compressed L2P table based on the first chunk of logical addresses not being sequentially written.

11. A system comprising:
a memory device; and
a processing device, operatively coupled with the memory device, to:
receive a write request that references a chunk of logical addresses;
write to a sequential set of physical addresses that correspond to the chunk of logical addresses in response to the write request;
update a sequential write entry in a sequential write table for the chunk of logical addresses to indicate that the chunk of logical addresses was sequentially written; and
update a compressed logical-to-physical (L2P) table based on (1) the sequential write table and (2) a full L2P table,
wherein the full L2P table includes a set of full L2P entries and each full L2P entry in the set of full L2P entries corresponds to a logical address in the chunk of logical addresses and references a physical address in the set of physical addresses,
wherein the compressed L2P table includes a compressed L2P entry that references a first physical address of the sequential set of physical addresses that is also referenced by a full L2P entry in the set of full L2P entries, and
wherein, for at least one first entry of the compressed L2P table, the first entry relates to more than one chunk of logical addresses indicated by the sequential write table as sequentially written.

12. The system of claim 11,
wherein a chunk of logical addresses is sequentially written when the chunk of logical addresses is associated with a sequential set of physical addresses such that each sequential pair of logical addresses in the chunk of logical addresses is associated with a sequential pair of physical addresses.

13. The system of claim 11, wherein the compressed L2P table consists of a number of chunks of logical addresses represented in the full L2P table.

14. A non-transitory computer-readable storage medium comprising instructions that, when executed by a processing device, cause the processing device to:
determine that a first chunk of logical addresses is sequentially written such that a first set of physical addresses mapped to corresponding logical addresses in the first chunk of logical addresses are sequential;
update, in response to determining that the first chunk of logical addresses is sequentially written, a first sequential write entry in a sequential write table for the first chunk of logical addresses to indicate that the first chunk of logical addresses was sequentially written;
update a compressed logical-to-physical (L2P) table based on (1) the sequential write table and (2) a full L2P table,
wherein the full L2P table includes a first set of full L2P entries and each full L2P entry in the first set of full L2P entries corresponds to a logical address in the first chunk of logical addresses and references a physical address in the first set of physical addresses,
wherein the compressed L2P table includes a first compressed L2P entry that references a first physical address of the first set of physical addresses that is also referenced by a first full L2P entry in the first set of full L2P entries;
determining whether the first chunk of logical addresses are sequential with a second chunk of logical addresses and whether the first set of physical addresses are sequential with a second set of physical addresses; and
in response to determining the first chunk of logical addresses is not sequential with the second chunk of logical addresses or determining the second set of physical addresses are not sequential with the first set of physical addresses, update the compressed L2P table by adding a second compressed L2P entry to the compressed L2P table for the second chunk of logical addresses and setting the second compressed L2P entry to reference a first physical address of the second set of physical addresses that is also referenced by a first full L2P entry in the second set of full L2P entries.

15. The non-transitory computer-readable storage medium of claim 14, wherein the compressed L2P table consists of a number of compressed L2P entries that is equal to the number of chunks of logical addresses that are sequentially written, wherein a chunk of logical addresses is sequentially written when the chunk of logical addresses is associated with a sequential set of physical addresses such that each sequential pair of logical addresses in the chunk of logical addresses is associated with a sequential pair of physical addresses.

16. The non-transitory computer-readable storage medium of claim 14, wherein the compressed L2P table consists of a number of chunks of logical addresses represented in the full L2P table.

17. The non-transitory computer-readable medium of claim 14, wherein the processing device is further to:
   detect a first read request that references one or more logical addresses in the first chunk of logical addresses;
   determine, based on the sequential write table, whether the first chunk of logical addresses is sequentially written; and
   fulfill the first read request based on the first compressed L2P entry in the compressed L2P table in response to determining that the first chunk of logical addresses is sequentially written.

18. The non-transitory computer-readable medium of claim 14, wherein the processing device is further to:
   detect a first read request that references one or more logical addresses in the first chunk of logical addresses;
   determine, based on the sequential write table, whether the first chunk of logical addresses is sequentially written; and
   fulfill the first read request based on the first set of full L2P entries in the full L2P table in response to determining that the first chunk of logical addresses is not sequentially written.

19. The non-transitory computer-readable medium of claim 14, wherein the processing device is further to:
   determine that a second chunk of logical addresses is sequentially written such that a second set of physical addresses mapped to corresponding logical addresses in the second chunk of logical addresses are sequential;
   update a second sequential write entry in the sequential write table for the second chunk of logical addresses to indicate that the second chunk of logical addresses was sequentially written; and
   update the compressed L2P table based on (1) the second sequential write entry and (2) the full L2P table, wherein the full L2P table includes a second set of full L2P entries and each full L2P entry in the second set of full L2P entries corresponds to a logical address in the second chunk of logical addresses and references a physical address in the second set of physical addresses.

20. The non-transitory computer-readable medium of claim 19, wherein the processing device is further to:
   determine whether the first chunk of logical addresses are sequential with a second chunk of logical addresses and whether the first set of physical addresses are sequential with a second set of physical addresses; and
   in response to determining the first chunk of logical addresses is sequential with the second chunk of logical addresses and the second set of physical addresses are sequential with the first set of physical addresses, updating the compressed L2P table by updating the first compressed L2P entry to reference a last logical address in the second chunk of logical addresses.

* * * * *